United States Patent
Son

(10) Patent No.: US 7,711,883 B2
(45) Date of Patent: May 4, 2010

(54) APPARATUS FOR PERFORMING PLUG AND PLAY, DIGITAL A/V SYSTEM USING THE SAME AND METHOD THEREOF

(75) Inventor: Hyeong Ho Son, Gwancheon-si (KR)

(73) Assignee: LG Electronics Inc., Seoul (KR)

( * ) Notice: Subject to any disclaimer, the term of this patent is extended or adjusted under 35 U.S.C. 154(b) by 515 days.

(21) Appl. No.: 11/313,807

(22) Filed: Dec. 22, 2005

(65) Prior Publication Data

US 2006/0143353 A1 Jun. 29, 2006

(30) Foreign Application Priority Data

Dec. 24, 2004 (KR) ...................... 10-2004-0112184

(51) Int. Cl.
G06F 7/10 (2006.01)
G06G 3/00 (2006.01)

(52) U.S. Cl. ........................... 710/302; 710/17; 710/19; 710/304; 709/224

(58) Field of Classification Search ....................... None
See application file for complete search history.

(56) References Cited

U.S. PATENT DOCUMENTS

2002/0035731 A1* 3/2002 Plotnick et al. ............. 725/146
2002/0161596 A1* 10/2002 Johnson et al. ................ 705/1
2004/0244054 A1* 12/2004 Sheu et al. .................. 725/131

FOREIGN PATENT DOCUMENTS

KR 10-2005-0000086 A 1/2005

* cited by examiner

Primary Examiner—Eron J Sorrell
Assistant Examiner—Dean Phan
(74) Attorney, Agent, or Firm—Birch, Stewart, Kolasch & Birch, LLP

(57) ABSTRACT

An apparatus for performing a plug and play function, a digital image processing system using the same, and a method thereof are provided. The apparatus includes: a device searching module for searching a connected device; a connection state analyzing module for determining whether the searched device is previously connected by comparing the type of device and a previous connection state; a storing unit for storing information about the type and the previous connection state; an information managing module for searching detail information of data stored in the connected device; a reproducing function verifying module for determining whether the data stored in the connected external device is processable; and a plug and play module for displaying the determination result and a selection menu for controlling the connected device to perform a target function according to a user's input.

28 Claims, 5 Drawing Sheets

RELATED ART

APPARATUS FOR PERFORMING PLUG AND PLAY, DIGITAL A/V SYSTEM USING THE SAME AND METHOD THEREOF

BACKGROUND OF THE INVENTION

1. Field of the Invention

The present invention relates to an apparatus for performing a plug and play function, a digital A/V system using the same and a method thereof.

2. Description of the Related Art

A user may ascertain devices connected to a digital image processing system through a menu displayed on a display of the digital image processing system, and the user is also allowed to control the connected devices through the displayed menu to perform a predetermined function of the connected devices. For example, a user may reproduce a MPEG1 layer 3 (MP3) music data or a joint photographic coding experts group (JPEG) picture data stored in a memory card through a digital TV.

Operations of the digital image processing system to reproduce a picture data stored in a memory card using an external device connecting device will be described using a digital television as an example of the digital image processing system with reference to accompanying drawings.

FIG. 1 is a block diagram illustrating a digital television having an external device connecting device according to the related art.

As shown in FIG. 1, the digital television having the external device connecting device according to the related art includes an analog input processing unit 130, a digital input processing unit 150, a stream controller 170, an external interfacing unit 190, an output signal processing unit 180, a system controller 110, a storing unit 120 and a user interfacing unit 111.

The analog input processing unit 130 includes a national television system committee (NTSC) decoder 131 and an MPEG encoder 132. The analog input processing unit 130 receives an analog signal, converts the received analog signal to a high-quality audio/video (A/V) digital data stream and outputs the A/V digital data stream.

The digital input processing unit 150 includes a tuner 151 and a vestigial side band (VSB) demodulator 152. The digital input processing unit 150 receives a digital signal, demodulates the digital signal to high-quality A/V digital data stream and outputs the A/V digital data stream.

The stream controller 170 selective outputs the A/V digital data streams from the analog input processing unit 130 and the digital input processing unit 150 in response to a system controller 110.

The external interfacing unit 190 connects an external device storing multimedia data, i.e., music, picture and moving image, to the digital television using a proper interface.

The output signal processing unit 180 includes a transport stream (TS) DEMUX 180, an MPEG decoder and a graphic processing unit 182. The output signal processing unit 180 processes the output signal of the stream controller 170 and outputs an analog A/V signal.

The system controller 110 generally controls the constitutional elements of the digital television having the external device connecting device according to a user's command inputted through the user interface 111 to process signals inputted from the digital television having the external device connecting device, to display an image and to perform functions such as recording images into the storing unit 120 or reproducing images stored in the storing unit 120.

Hereinafter, a procedure of reproducing picture data stored in a memory card using a digital television having an external device connecting device according to the related art will be described.

At first, a memory card storing picture data is connected to the digital television through the external interfacing unit 190 to reproduce the picture data stored in the memory card through the digital television while a user is watching a TV program.

The user displays a menu of the digital television through the user interface 111 to control modes of the digital television.

The system controller 110 reads the stored data from the memory card through the external interfacing unit 190 and stores the read data in the storing unit 120 or outputs the read data on a display after processing the read data through the output signal processing unit 180 according to a user's command inputted through the displayed menu.

Generally, a user connects an external device to a digital image processing system to use a predetermined function of the external device. However, the related art digital image processing system allows the user to use the target function of the external device only through a preprocess operation such as displaying a menu and selecting a target function among displayed menus.

Since a user generally are not familiar with such an controlling mechanism of external devices provided from the digital television, the user needs to learn how to control the digital television to normally perform a target function of the connected external device. While the user learns to control the digital television through trial and error, the user general makes mistakes to control the external device. Such a mistake may delete valuable information stored in the external device. According to the difficulties of controlling the digital television, a user seldom uses the functions of the digital television to control the external device.

SUMMARY OF THE INVENTION

An object of the present invention is to provide an apparatus for performing a plug and play function for a digital image processing system and a method thereof allowing a user to control functions of connected external devices without learning necessary operations of the digital image processing system to control the connected external device and without searching a necessary function of the digital image processing system to perform a target operation of the connected external device by automatically searching a device connected to the digital image processing system and noticing variation of connection state to a user, or searching processable multimedia data stored in the connected device and notices the searching result to a user.

According to an aspect of the present invention, there is provided an apparatus of performing a plug and play function for a digital image processing system, the apparatus including: a device searching module for searching an external device connected to the digital image processing system through a predetermined interface; a connection state analyzing module for determining whether the searched external device is previously connected to the digital image processing system when the external device is connected to the digital image processing system by comparing the type of connected device and a connection state before searching the external device; a storing unit for storing information about the type and the previous connection state of the searched external device; an information managing module for searching detail information of data stored in the connected external device and outputting the searching result; a reproducing function verifying module for determining whether the data stored in the connected external device is processable by the digital image processing system based on the searching result from the information managing module; and a plug and play module for displaying the determination result from the reproducing function module and a selection menu for controlling the connected device to perform a target function according to a user's input.

The connection state analyzing module may determine whether data stored in an internal device disposed in the digital image processing system is updated or not, output update information of the data to the information managing module if the data is updated, and perform a plug and play function for the updated data stored in the internal device.

According to another aspect of the present invention, there is provided a method of performing a plug and play function for a digital image processing system including: a) searching an external device connected to the digital image processing system through a predetermined interface; b) determining whether the searched external device is previously connected to the digital image processing system when the external device is connected to the digital image processing system by comparing the type of connected device and a connection state before searching the external device; c) storing information about the type and the previous connection state of the searched external device; d) searching detail information of data stored in the connected external device and outputting the searching result; e) determining whether the data stored in the connected external device is processable by the digital image processing system based on the searching result; and f) displaying the determination result and a selection menu for controlling the connected device and performing a target function according to a user's input.

The digital image processing system may be a high definition television or a set-top box.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
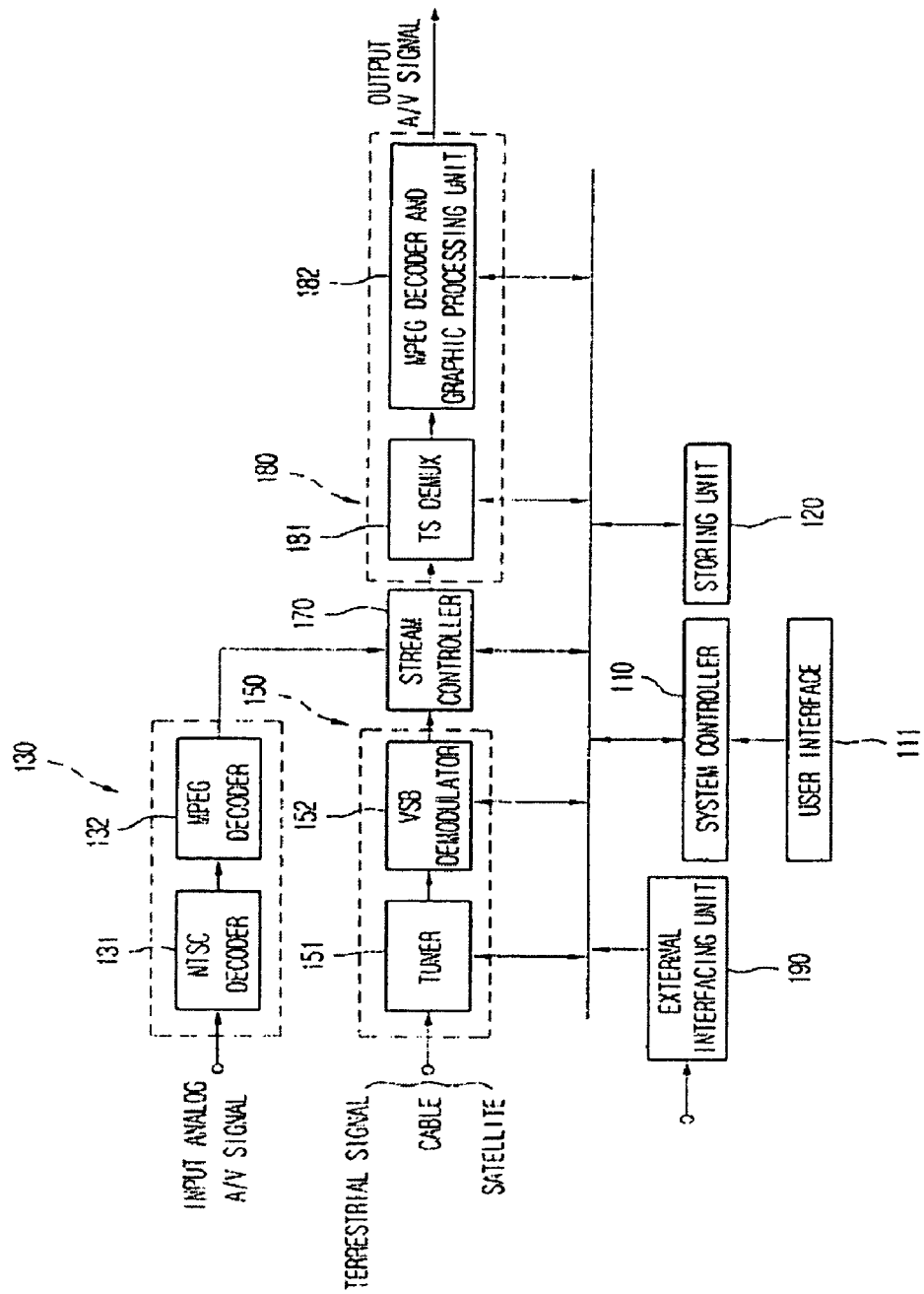
FIG. 1 is a block diagram illustrating a digital image processing system according to the related art.
Figure 2:
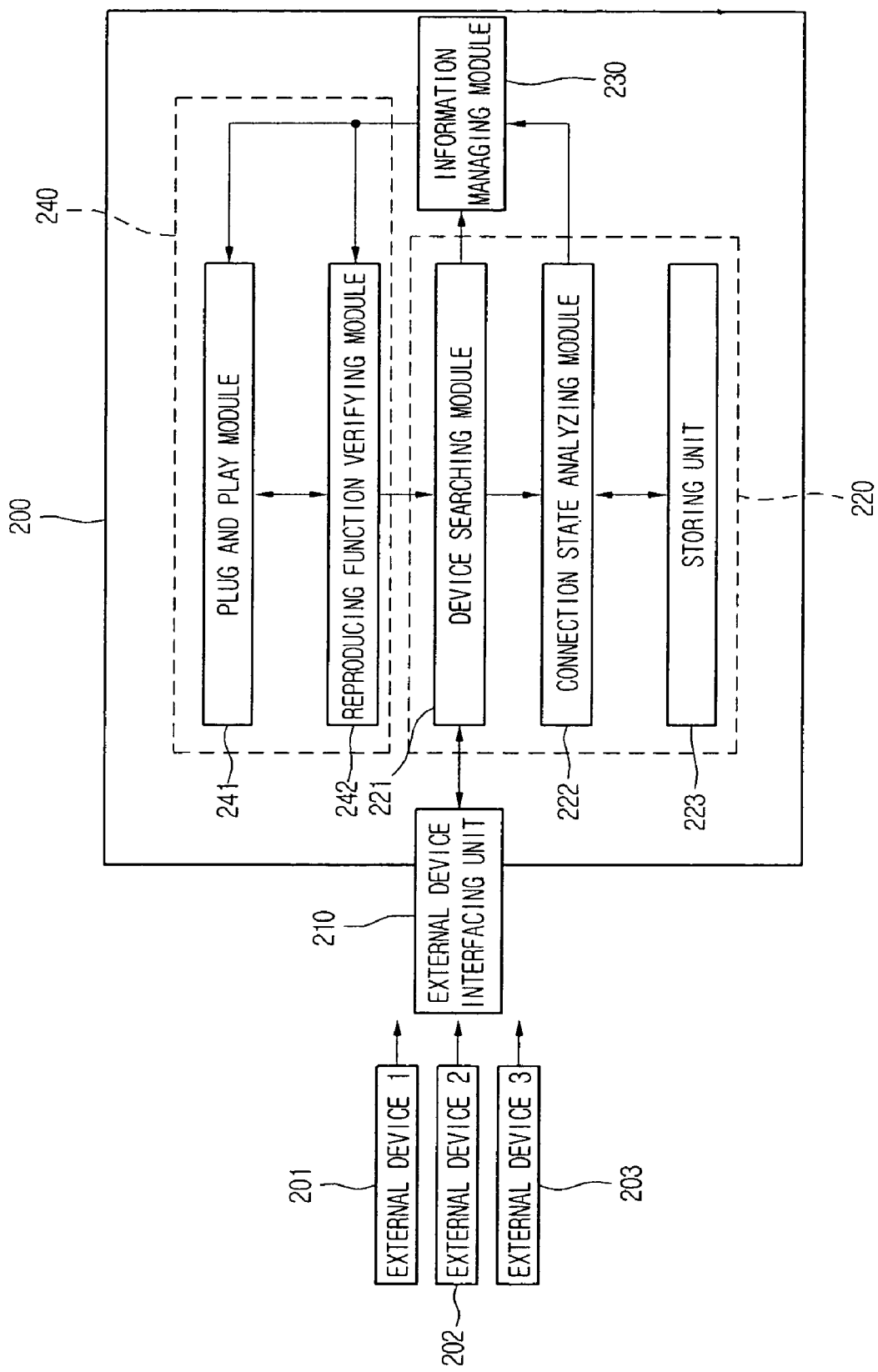
FIG. 2 is a block diagram ditching an apparatus for performing a plug and play function of a digital image processing system according to an embodiment of the present invention.

FIG. 2 is a block diagram illustrating an apparatus of performing a plug and play function for a digital image processing system according to an embodiment of the present invention.

As shown in FIG. 2, the plug and play apparatus according to the present embodiment includes a device searching module 221, a connection state analyzing module 222, a storing unit 223, an information managing module 230, a reproducing function verifying module 241 and a plug and play module 242.

The device searching module 221 searches external devices 201, 202 and 203 connected to the digital image processing system. The device searching module 221 performs a periodic task to search the external devices connected to the digital image processing system and outputs information about whether these external devices are connected to the digital image processing system or not.

The connection state analyzing module 222 determines whether or not the connected external devices are newly connected to the digital image processing system by comparing the types of searched devices and connection state information stored in the storing unit 223. The connection state information may be a previous connection state of the searched device or connection states of external devices when the digital image processing system is turned off. The connection state analyzing module 222 may periodically check data stored in an internal device, i.e., a hard disk driver (HDD) of a storing unit to determine whether or not data stored in the internal device are updated. Then, the connection state analyzing module 222 may output information about the data update of the internal device.

The storing unit 223 receives state information of previously connected external devices or newly searched external devices from the connection state analyzing module 222 and stores the received information. The storing unit 223 also receives the update information of data stored in an internal device, i.e., a HDD or a DVD device, and stores the received information.

The information managing module 230 manages the information of new external device and state variation information of connected devices which are outputted from the device searching module 221 and the connection state analyzing module 222. Furthermore, the information managing module 230 analyzes data stored in new searched devices including both of external devices and internal devices by determining whether the analyzing data in the searched devices is necessary to perform or not.

The reproducing function verifying module 241 determines whether the digital image processing system is capable of processing the data stored in the connected device or whether the digital image processing system has a target function based on the analysis result of the information managing module 230.

The plug and play module 242 displays results of the reproducing function verifying module 241 and performs a predetermined function according to a user's input. For example, if the digital image processing system supports functions of processing information stored in the connected device, the supported functions are displayed, and the plug and play module 242 waits for the user's input. If a user selects one of the displayed functions, the selected function is performed.

Figure 3:
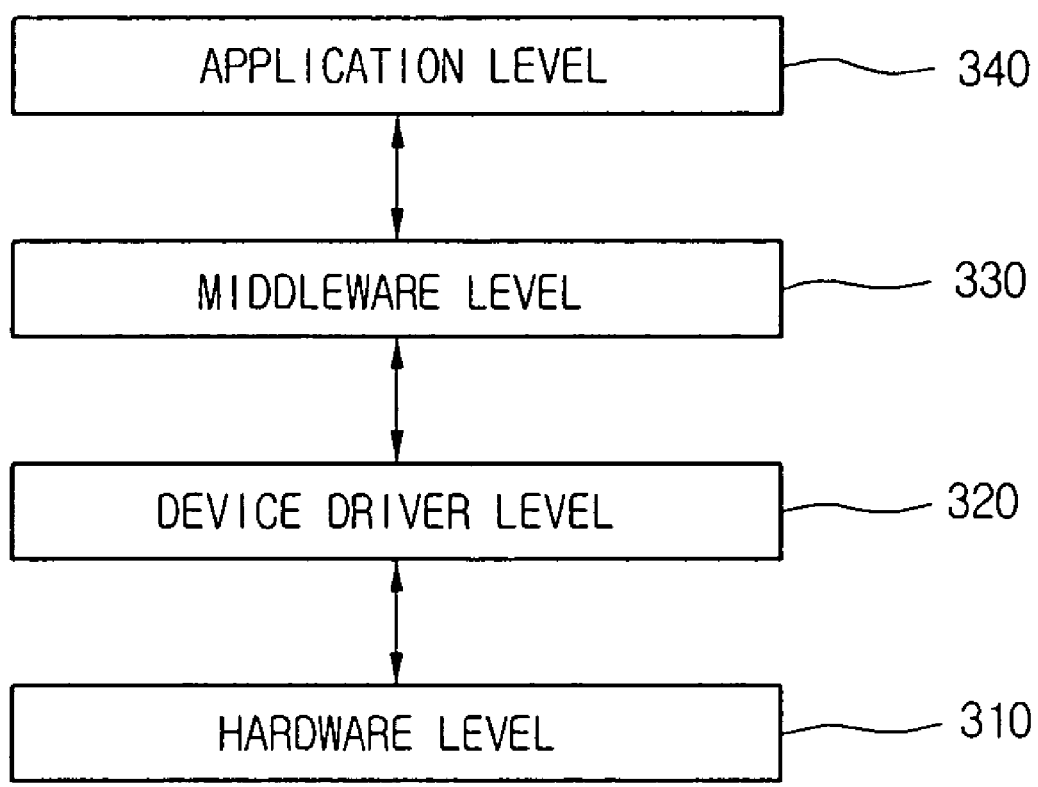
FIG. 3 shows a hierarchical structure of a digital image processing system including a plug and play apparatus according to an embodiment of the present invention.

FIG. 3 shows a hierarchical structure of a digital image processing system including a plug and play apparatus according to an embodiment of the present invention.

Referring to FIG. 3, the external interfacing unit 210 manages physical connection states of external devices 201, 202 and 203 in a hardware level 310.

In a device driver level 320, the device searching module 221 performs the period task to search devices connected to the digital image processing system and notices the connection state of the searched devices to a middleware level 330.

In the middleware level 330, the connection state analyzing module 222 determines whether a new device is connected to the digital image processing system or not by comparing the type of device searched by the device searching module 221 and the previous connection state of external devices stored in the storing unit 223. Also, the information managing module 230 analyzes data stored in the connected device and outputs the analysis results if the information managing module 230 determines that such an analyzing operation is necessary.

Determination whether the digital image processing system has a corresponding function to recognize and to process data stored in the connected device may be performed in the middleware level 330 or an application level 340. In the present embodiment, the reproducing function verifying module 241 performs the determination function.

In the application level 340, the plug and play module 242 displays the results of searched devices and a user performs a target function of the connected device, i.e., a function of reproducing data, through the digital image processing system.

Hereinafter, a method of performing a plug and play function of a digital image processing system according to an embodiment of the present invention will be described.

Figure 4:
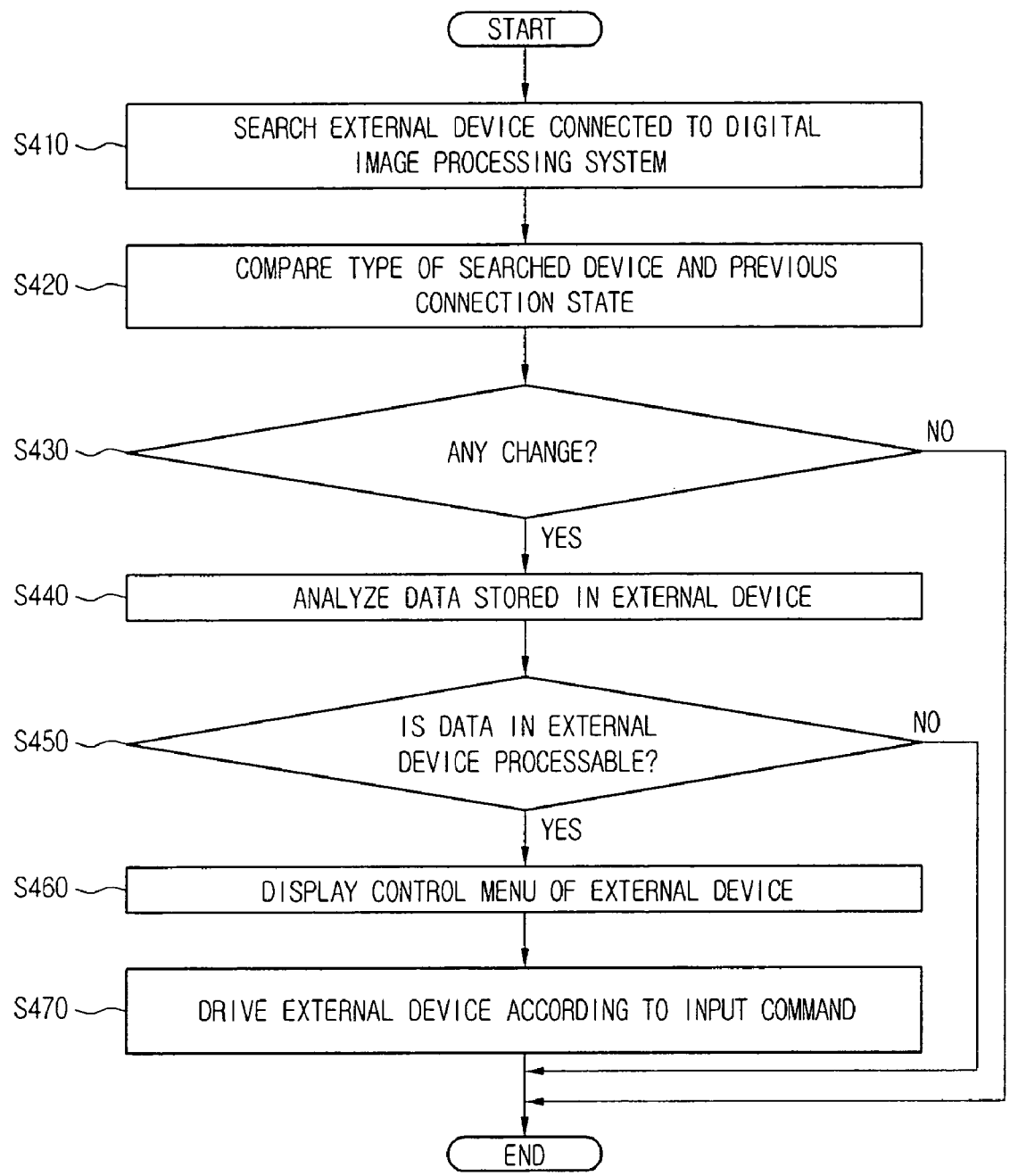
FIG. 4 is a flowchart showing a method of performing a plug and play function to control an external device connected to a digital image processing system according to an embodiment of the present invention.

FIG. 4 is a flowchart showing a method of performing a plug and play function of a digital image processing system according to an embodiment of the present invention.

The plug and play method according to the present embodiment will be described when a memory card is connected to the digital image processing system with reference to FIG. 4.

At first, a memory card is connected to the digital image processing system through the external device interfacing unit 210 while a user is watching a TV program through the digital image processing system.

Accordingly, the device searching module 221 detects a connection state of the memory card through the periodic task and outputs the external device connection information related to the memory card in operation S410.

The connection state analyzing module 222 detects the type of the memory card searched by the device searching module 221, reads the information of the previous connection state of the memory card or the connection states of external devices when the digital image processing system is turned off from the storing unit 223, and compares the information based on the external device connection information in operation S420. Then, the connection state analyzing module 222 determines whether the searched device is newly connected or not according to the comparison result and outputs the current state of the searched memory card in operation S430.

The storing unit 223 stores the current state of the memory card outputted from the connection state analyzing module 222 as described above.

The information managing module 230 receives the information of the newly searched memory card and the state variation information of the connected memory card which are outputted from the device searching module 221 and the connection state analyzing module 222. Then, the information managing module 230 analyzes the data stored in the connected device in operation S440 if the information managing module 230 determines that the analysis operation of the data is necessary based on the received information. The information managing module 230 outputs the analysis result to the reproducing function verifying module 241.

The reproducing function verifying module 241 determines whether the digital image system is capable of reproducing the data stored in the connected device or not in operation S540 based on the information from the information managing module 230. Then, the result thereof is outputted to the plug and play module 242.

The plug and play module 242 displays a control menu to process information stored in the memory card based on the determination result from the reproducing function verifying module 241 in operation S460, and controls the external device, for example, to reproduce the data stored in the external device, according to a user's command in operation S470.

The reproducing function verifying module 241 reads detail information of the connected memory card, determines whether the connected memory card stores processable data such as music data to be reproduced, picture data to be displayed or data to be copied to a HDD, and determined whether the digital image processing system is capable of performing functions in correspondent to the data stored in the memory card.

The plug and play module 242 displays information of the processable data among the data stored in the connected memory card, transforms an operation mode of the digital image processing system to a predetermined operation mode of, for example, reproducing music data, displaying picture data or copying data to a HDD, and displays corresponding control menu.

When a user inputs a control command according to the displayed control menu, the plug and play 242 controls the digital image processing system to perform necessary operations according to the input control command.

If there is no change in the connection state of external devices in operation S430 or if the data stored in the external device can not be processed in the digital image processing system in operation S450, the plug and play procedure is terminated.

The described plug and play method according to the present invention can be applied to an internal device as well as the external device. For example, the plug and play method according to the present invention is applicable when a mass storage device such as a hard disk driver (HDD) is internally included in the digital image processing system.

Figure 5:
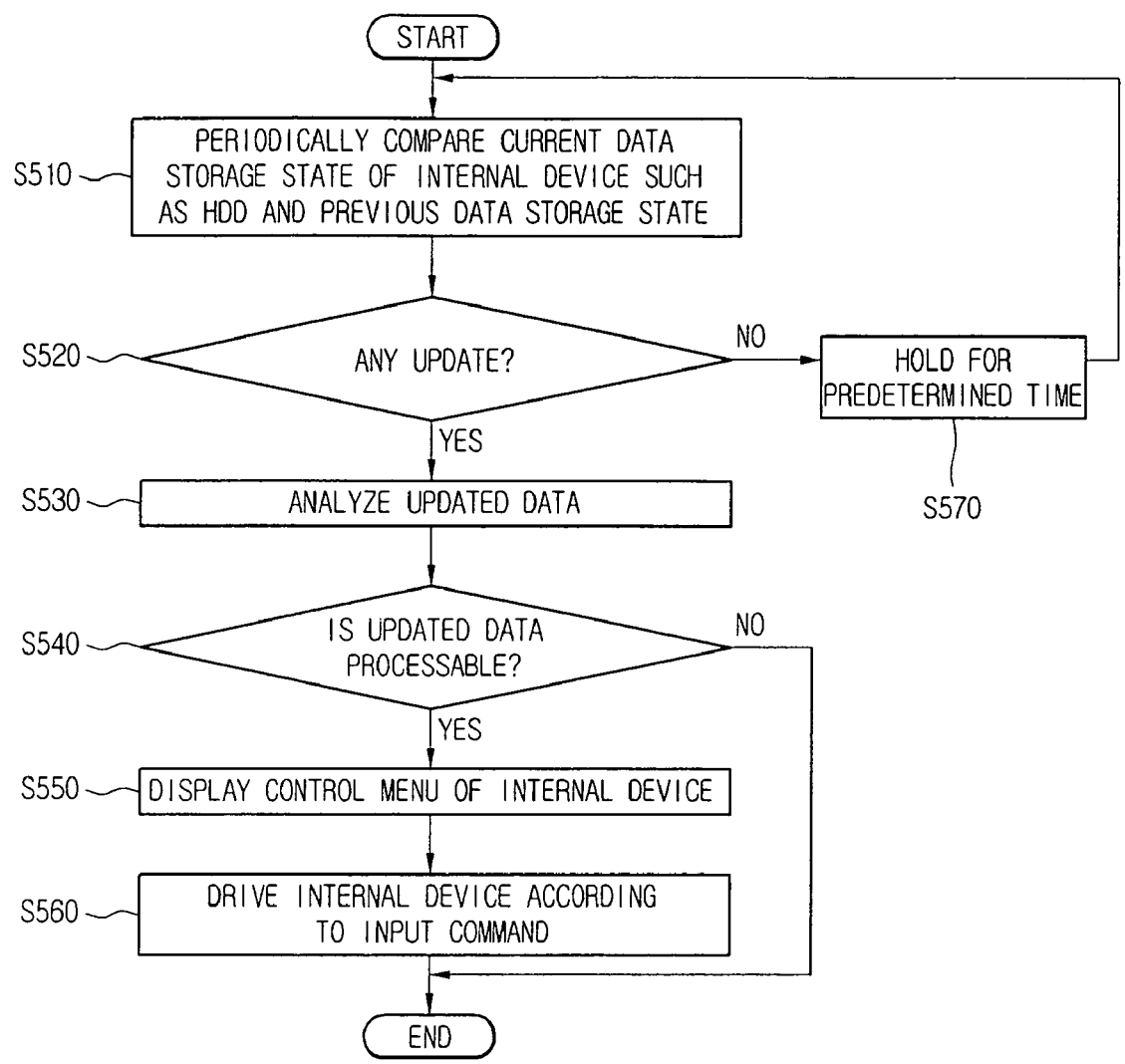
FIG. 5 is a flowchart showing a method of performing a plug and play function to control an external device connected to a digital image processing system according to another embodiment of the present invention.

FIG. 5 is a flowchart showing a plug and play method controlling such an internal device. In FIG. 5, a HDD is used as an example to describe the plug and play method according to the present invention. At first, current data storage state of the internal device is compared with a previous data storage state in operation S510. If they are identical, the operation S510 is re-performed after a predetermined time, i.e., 30 minutes, is passed in operation S570. That is, the current data storage state and the previous data storage state are compared again in operation S510. If the current data storage state differs from the previous data storage state, for example, if the data is updated in operation S520, the updated data is analyzed in operation S530. Then, it determines whether or not the updated data can be processed in the digital image processing system in operation S540. If the updated data can be processed, a control menu for the internal device is displayed in operation S550. When a user inputs a control command according to the displayed menu, the internal device is controlled to reproduce the updated data stored in the internal device in operation S560. Herein, the operations S520 to S560 are identical to the operations S430 to 470 shown in FIG. 4. Therefore, detail descriptions thereof are omitted.

According to the operations described above, the plug and play method according to the present invention determines whether data storage state of HDD is changed when the digital image processing system is turned on by comparing the current HDD data storage state and the previous HDD data storage state stored when the digital image processing system is lastly turned off, and the plug and play method performs necessary operation for the changed data storage state of HDD.

Although the data storage state of internal device, for example, a HDD, varies while the digital image processing system is in an operation mode or a hibernation mode, the plug and play method according to the present invention may perform necessary operation for the changed data storage state of HDD.

In this case, it determines whether a device connected to the digital image processing system can be cooperated with a predetermined function of the HDD, the changed data storage state of HDD is displayed and controls the predetermined function according to the user's input.

It will be apparent to those skilled in the art that various modifications and variations can be made in the present invention. Thus, it is intended that the present invention covers the modifications and variations of this invention provided they come within the scope of the appended claims and their equivalents.

As described above, the plug and play apparatus of the digital image processing system and a method thereof searches a device connected to the digital image processing system and notices variation of connection state to a user, or searches processable multimedia data stored in the connected device and notices the searching result to a user. Therefore, the user conveniently controls the connected external device without learning necessary operations of the digital image processing system to control the connected external device and without searching a necessary function of the digital image processing system to perform a target operation for the data stored in the external device.

What is claimed is:

1. An apparatus of performing a plug and play function for a digital television, the apparatus comprising:
   a device searching module configured to search an external device physically connected to the digital television through a predetermined interface;
   a storing unit configured to store a device type and a connection state of the external device which was previously searched;
   a connection state analyzing module configured to determine whether the searched external device from the device searching module was previously connected to the digital television to perform the plug and play function by comparing the device type and the connection state of the searched external device with the device type and the connection state in the storing unit in response to detecting the physical connection of the searched external device to the digital television;
   a reproducing function verifying module configured to determine whether data stored in the searched external device is processable by the digital television and to generate a determination result when the device type and the connection state of the searched external device does not match with the device type and the connection type in the storing unit; and
   a plug and play module configured to display the determination result from the reproducing function module and a selection menu to control the searched external device to perform a target function according to a user's input when the data in the search external device is processable, and to terminate when the device type and the connection state of the external device matches with the device type and connection type in the storing unit or the data in the searched external device can not be processed.

2. The apparatus according to claim 1, wherein the connection state analyzing module is configured to determine whether data stored in an internal device disposed in the digital television is updated or not, to output update information if the data stored in the internal device is updated, and to enable the plug and play module to perform the plug and play function for the updated data stored in the internal device.

3. The apparatus according to claim 2, wherein the digital television is a high definition television.

4. The apparatus according to claim 2, wherein the predetermined interface is a universal serial bus.

5. The apparatus according to claim 2, wherein the predetermined interface is IEEE 1394.

6. The apparatus according to claim 2, wherein the internal device or the searched external device includes a hard disk driver.

7. The apparatus according to claim 2, wherein the internal device or the searched external device is a digital versatile disc driver.

8. The apparatus according to claim 2, wherein the external device is a memory card.

9. A digital television including a plug and play apparatus comprising:
   a device searching module configured to search an external device physically connected to the digital television through a predetermined interface;
   a storing unit configured to store a device type and a connection state of the external device which was previously searched;
   a connection state analyzing module configured to determine whether the searched external device from the device searching module was previously connected to the digital television to perform the plug and play function by comparing the device type and the connection state of the searched external device with the device type and the connection state in the storing unit in response to detecting the physical connection of the searched external device to the digital television;
   a reproducing function verifying module configured to determine whether data stored in the searched external device is processable by the digital television and to generate a determination result when the device type and the connection state of the searched external device does not match with the device type and the connection type in the storing unit; and
   a plug and play module configured to display the determination result from the reproducing function module and a selection menu to control the searched external device to perform a target function according to a user's input when the data in the search external device is processable, and to terminate when the device type and the connection state of the external device matches with the device type and connection type in the storing unit or the data in the searched external device can not be processed.

10. The digital television according to claim 9, wherein the connection state analyzing module is configured to determine whether data stored in an internal device disposed in the digital television is updated or not to output update information if the data stored in the internal device is updated and to enable the plug and play module to perform the plug and play function for the updated data stored in the internal device.

11. The digital television according to claim 10, wherein the digital television is a high definition television.

12. The digital television according to claim 10, wherein the predetermined interface is a universal serial bus.

13. The digital television according to claim 10, wherein the predetermined interface is IEEE 1394.

14. The digital television according to claim 10, wherein the internal device or the searched external device includes a hard disk driver.

15. The digital television according to claim 10, wherein the internal device or the searched external device is a digital versatile disc driver.

16. The digital television according to claim 10, wherein the searched external device is a memory card.

17. A method of performing a plug and play function for a digital television, comprising:
  periodically searching, by a device searching module, an external device physically connected to the digital television through a predetermined interface;
  storing a device type and a connection state of the external device which was previously searched in a storm unit;
  determining whether the searched external device from the searching module was previously connected to the digital television to perform the plug and play function by comparing the device type and the connection state of the searched external device with the device type and the connection state in the storing unit in response to detecting the physical connection of the searched external device to the digital television;
  determining, by a reproducing function verifying module, whether data stored in the searched external device is processable by the digital television and generating a determination result when the device type and the connection state of the searched external device does not match with the device type and the connection type in the storm unit; and
  displaying, by the plug and play module, the determination result and a selection menu from the reproducing function verifying module to control the physically connected device and performing a target function according to a user's input when the data in the search external device is processable, and terminating when the device type and the connection state of the external device matches with the device type and connection type in the storing unit or the data in the searched external device can not be processed.

18. The method according to claim 17, further comprising:
  determining whether data stored in an internal device in the digital television is updated or not; and
  if the data stored in the internal device is updated, performing the plug and play function for the updated data stored in the internal device.

19. The method according to claim 17, wherein the digital television is a high definition television.

20. The method according to claim 17, wherein the predetermined interface is a universal serial bus.

21. The method according to claim 17, wherein the predetermined interface is IEEE 1394.

22. The method according to claim 17, wherein the internal device or the searched external device includes a hard disk driver.

23. The method according to claim 17, wherein the internal device or the searched external device is a digital versatile disc driver.

24. The method according to claim 17, wherein the searched external device is a memory card.

25. The apparatus according to claim 1, further comprising:
  an information managing module configured to search detail information of data stored in the physically connected external device and to output a corresponding search result, wherein the reproducing function verifying module is configured to determine whether the data is processable based upon the search result.

26. The digital television according to claim 9, further comprising:
  an information managing module configured to search detail information of data stored in the physically connected external device and to output a corresponding search result, wherein which the reproducing function verifying module is configured to determine whether the data is processable based upon the search result.

27. The method according to claim 17, further comprising:
  searching detail information of data stored in the physically connected external device and outputting a corresponding search result, wherein the step of determining comprises determining based upon the search result.

28. The method according to claim 17, further comprising:
  storing the detected device type and a connection state of the searched external device.

\* \* \* \* \*